(12) United States Patent
Shiina

(10) Patent No.: US 11,916,483 B2
(45) Date of Patent: Feb. 27, 2024

(54) SWITCHING REGULATOR CONTROL CIRCUIT AND DC/DC CONVERTER

(71) Applicant: ABLIC Inc., Tokyo (JP)

(72) Inventor: Yoshiomi Shiina, Tokyo (JP)

(73) Assignee: ABLIC INC., Nagano (JP)

( * ) Notice: Subject to any disclaimer, the term of this patent is extended or adjusted under 35 U.S.C. 154(b) by 212 days.

(21) Appl. No.: 17/689,466

(22) Filed: Mar. 8, 2022

(65) Prior Publication Data

US 2022/0294348 A1 Sep. 15, 2022

(30) Foreign Application Priority Data

Mar. 11, 2021 (JP) ................. 2021-038802

(51) Int. Cl.
*H02M 3/158* (2006.01)
*H02H 7/12* (2006.01)
*H02M 1/32* (2007.01)

(52) U.S. Cl.
CPC .......... *H02M 3/158* (2013.01); *H02H 7/1213* (2013.01); *H02M 1/32* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; (Continued)

(56) References Cited

U.S. PATENT DOCUMENTS 9,479,054 B2 * 10/2016 Shiina .................... H02M 3/158
9,608,521 B2 * 3/2017 Shiina .................... H02M 3/157
(Continued)

FOREIGN PATENT DOCUMENTS

JP 2009-153278 A 7/2009

*Primary Examiner* — Jeffrey A Gblende
(74) *Attorney, Agent, or Firm* — Crowell & Moring LLP

(57) ABSTRACT

Provided is a DC/DC converter capable of providing overvoltage protection reliably without being affected by, for example, an external element connected to an output terminal. The DC/DC converter includes a comparator, an RS-FF circuit, a drive circuit, and an ON-timer circuit, and the ON-timer circuit includes: a current source circuit which provides an electric current based on a power supply voltage; a ripple generation circuit which generates a ripple voltage; an averaging circuit which averages the ripple voltage; a timer circuit which generates an ON-timer signal; and an overvoltage protection circuit (clamp circuit).

6 Claims, 4 Drawing Sheets

(58) Field of Classification Search
CPC .......... H02M 1/0045; H02M 1/0009; H05B 39/048; B23K 11/24; H04B 2215/069
See application file for complete search history.

(56) References Cited

U.S. PATENT DOCUMENTS 9,800,149 B2* 10/2017 Kawano .......... H02M 1/08
2013/0038236 A1* 2/2013 Mitarashi .......... H05B 45/375
323/284

* cited by examiner

SWITCHING REGULATOR CONTROL CIRCUIT AND DC/DC CONVERTER

RELATED APPLICATIONS

This application claims priority to Japanese Patent Application No. 2021-038802, filed on Mar. 11, 2021, the entire content of which is incorporated herein by reference.

BACKGROUND OF THE INVENTION

1. Field of the Invention

The present invention relates to a switching regulator control circuit and a DC/DC converter, and more particularly, to overvoltage protection of an output voltage.

2. Description of the Related Art

FIG. 6 shows a DC/DC converter including an overvoltage protection circuit according to a related art.

The DC/DC converter of FIG. 6 includes a chopper regulator 2, a DC power source 3, a Zener diode 4, an inductor 5, an output capacitor 6, a voltage-dividing resistor 7, a voltage-dividing resistor 8, a resistor 9, and a phase compensation capacitor 10.

The chopper regulator 2 includes an input terminal 11, an output terminal 12, an adjustment terminal 13, a compensation terminal 14, a current amplifier 15, a comparator 16, an oscillator 17, an inverter 18, an SR flip-flop 19, a NAND circuit 20, a drive circuit 21, a switching element 22, an error amplifier 23, a reference voltage source 24, and a switching element 25. The switching element 25 having a gate controlled with an output voltage from the error amplifier 23 forms the overvoltage protection circuit.

In the DC/DC converter including the overvoltage protection circuit of the related art, the switching element 25 is configured to turn ON, when detecting that an output voltage from the DC/DC converter reaches an overvoltage based on the output voltage from the error amplifier 23, and to discharge the phase compensation capacitor 10, to thereby prevent the overvoltage of the output voltage (see, for example, Japanese Patent Application Laid-open No. 2009-153278).

However, the DC/DC converter described above detects the overvoltage of the output terminal 12 based on an output voltage Vout, and therefore has problems in that the overvoltage is erroneously detected when a failure occurs in an external element connected to the output terminal 12, and the overvoltage cannot be detected when the external element is physically disconnected.

SUMMARY OF THE INVENTION

The present invention has been made in view of the above-mentioned problems, and therefore has an object to provide a DC/DC converter capable of providing overvoltage protection reliably without being affected by, for example, an external element connected to an output terminal 12.

According to at least one aspect of the present invention, there is provided a switching regulator control circuit, including: a comparator configured to compare a divided voltage corresponding to an output voltage from a DC/DC converter and a reference voltage; an RS-FF circuit having a set terminal connected to an output terminal of the comparator, and an output terminal connected to an input terminal of a drive circuit; and an ON-timer circuit having an input terminal connected to the output terminal of the RS-FF circuit, and an output terminal connected to a reset terminal of the RS-FF circuit, the ON-timer circuit including: a current source circuit configured to provide an electric current based on a power supply voltage; a ripple generation circuit configured to generate a ripple voltage depending on the electric current of the current source circuit and an output signal from the RS-FF circuit; an averaging circuit configured to average the ripple voltage; a timer circuit configured to generate an ON-timer signal depending on the electric current of the current source circuit, the output signal from the RS-FF circuit, and the averaged ripple voltage; and a clamp circuit (overvoltage protection circuit) configured to clamp the ripple voltage to a predetermined voltage.

According to the switching regulator control circuit of the present invention, through provision of the overvoltage protection circuit to the ON-timer, overvoltage protection can be provided reliably without being affected by, for example, an external element connected to the output terminal 12.

DETAILED DESCRIPTION OF THE PREFERRED EMBODIMENTS

Now, a switching regulator control circuit according to at least one embodiment of the present invention is described with reference to the drawings.

Figure 1:
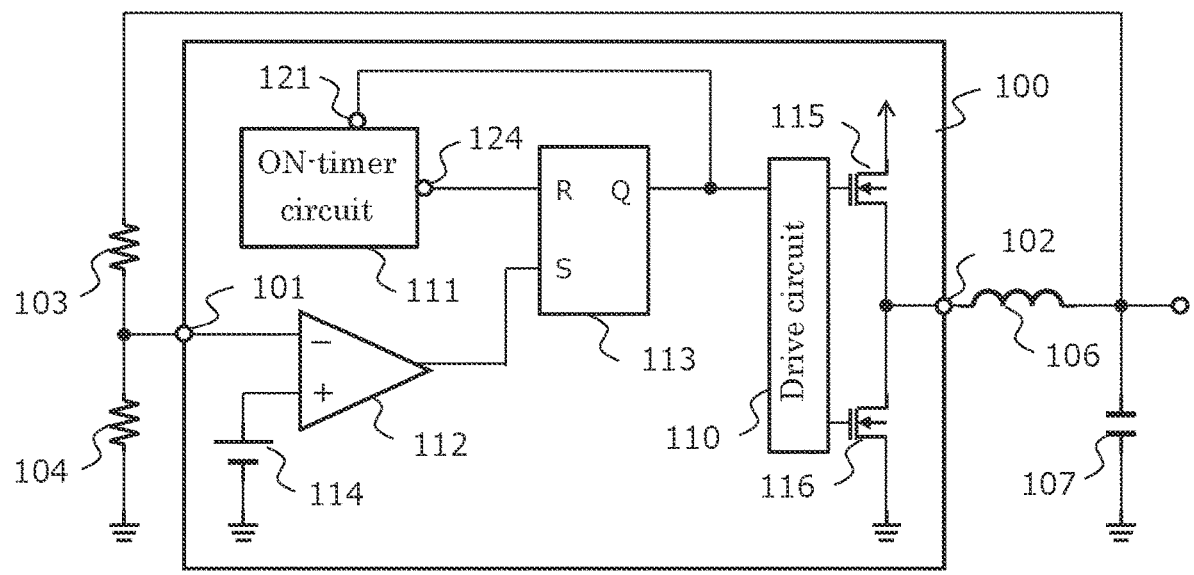
FIG. 1 is a block diagram for illustrating a DC/DC converter including a switching regulator control circuit according to at least one embodiment of the present invention.

FIG. 1 is a block diagram for illustrating a DC/DC converter including the switching regulator control circuit according to the at least one embodiment of the present invention.

The DC/DC converter of FIG. 1 includes a switching regulator control circuit 100, resistors 103 and 104 forming a voltage divider circuit, a coil 106, and a capacitor 107. The switching regulator control circuit 100 includes an input terminal 101, an output terminal 102, a drive circuit 110, an ON-timer circuit 111 including an overvoltage protection circuit, a comparator 112, an RS-FF circuit 113, a reference voltage circuit 114, and NMOS transistors 115 and 116 which are switching transistors.

The resistor 103 and the resistor 104 are connected between an output terminal of the DC/DC converter and a ground terminal to form a feedback resistor circuit. The comparator 112 has an inverting input terminal connected to an output terminal of the feedback resistor circuit via the input terminal 101, a non-inverting input terminal connected to a positive electrode of the reference voltage circuit 114, and an output terminal connected to a set terminal S of the RS-FF circuit 113. The RS-FF circuit 113 has a reset terminal R connected to an output terminal 124 of the ON-timer circuit 111, and an output terminal Q connected to an input terminal of the drive circuit 110 and an input terminal 121 of the ON-timer circuit 111. The drive circuit 110 has a first output terminal connected to a gate of the NMOS transistor 115, and a second output terminal connected to a gate of the NMOS transistor 116. The NMOS transistor 115 has a drain connected to a power supply terminal, and a source connected to one terminal of the coil 106. The NMOS transistor 116 has a drain connected to the one terminal of the coil 106, and a source connected to the ground terminal. The capacitor 107 has one terminal connected to the other terminal of the coil 106, and the other terminal connected to the ground terminal.

The DC/DC converter configured as described above operates as follows.

The DC/DC converter provides an output voltage Vout when a power supply voltage is supplied thereto. The resistors 103 and 104 forming the feedback resistor circuit divide the output voltage Vout and provide a divided voltage VFB. The switching regulator control circuit 100 provides an output signal depending on the divided voltage VFB supplied via the input terminal 101 to the output terminal 102.

The reference voltage circuit 114 provides a reference voltage Vref. The comparator 112 compares the reference voltage Vref supplied to a non-inverting input terminal+ and the divided voltage VFB supplied to an inverting input terminal−, and provides a signal VS from the output terminal. The RS-FF circuit 113 provides a signal VQ of a High level from the output terminal Q when the signal VS of a High level is supplied to the set terminal S. When the signal VQ of the High level is supplied thereto, the drive circuit 110 provides a drive signal of a High level from the first output terminal to the gate of the NMOS transistor 115, and provides a drive signal of a Lo level from the second output terminal to the gate of the NMOS transistor 116. The ON-timer circuit 111 receives an input of the signal VQ to the input terminal 121, and provides an ON-time signal VR from the output terminal 124 to the reset terminal R of the RS-FF circuit 113. When the signal VR of a High level is supplied to the reset terminal R, the RS-FF circuit 113 provides the signal VQ of a Lo level from the output terminal Q. When the signal VQ of the Lo level is supplied thereto, the drive circuit 110 provides the drive signal of the Lo level from the first output terminal to the gate of the NMOS transistor 115, and provides the drive signal of the High level from the second output terminal to the gate of the NMOS transistor 116.

First Embodiment

Figure 2:
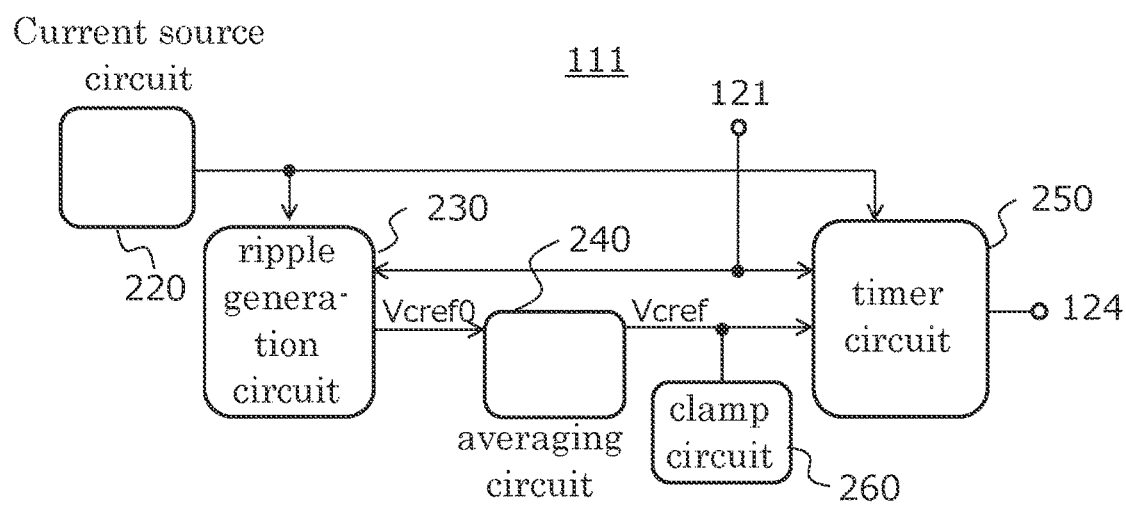
FIG. 2 is a block diagram for illustrating a configuration of an ON-timer circuit including an overvoltage protection circuit in a first embodiment of the present invention.

FIG. 2 is a block diagram for illustrating a configuration of the ON-timer circuit 111 including the overvoltage protection circuit in a first embodiment of the present invention.

The ON-timer circuit 111 includes a current source circuit 220, a ripple generation circuit 230, an averaging circuit 240, a timer circuit 250, and a clamp circuit 260 which is the overvoltage protection circuit.

The current source circuit 220 supplies an electric current I1 which depends on the power supply voltage to the ripple generation circuit 230 and the timer circuit 250. The ripple generation circuit 230 provides a voltage Vcref0 which includes a ripple component and is proportional to the output voltage Vout depending on the electric current I1 and the signal VQ which are supplied thereto. The averaging circuit 240 provides a voltage Vcref obtained by averaging the voltage Vcref0. The timer circuit 250 generates the signal VR to be provided to the reset terminal R of the RS-FF circuit 113 depending on the electric current I1 and the voltage Vcref which are supplied to the timer circuit 250.

Figure 3:
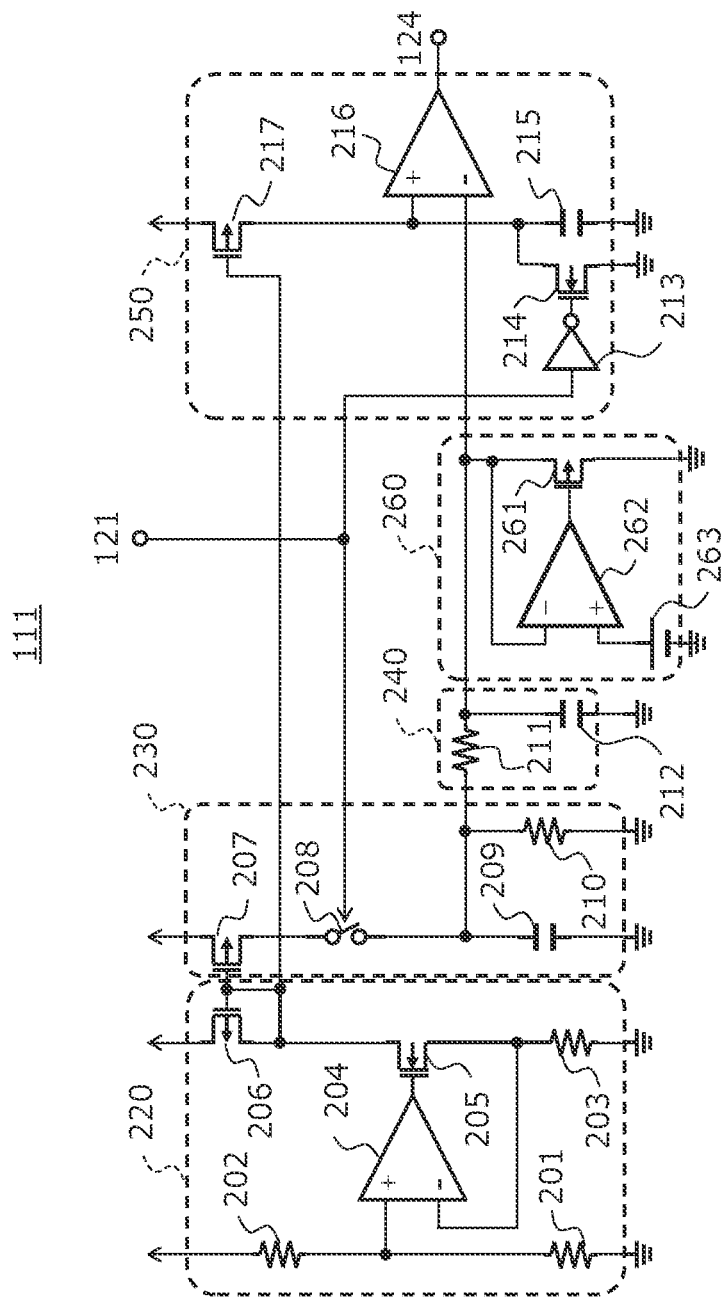
FIG. 3 is a circuit diagram for illustrating an example of the ON-timer circuit of FIG. 2.

FIG. 3 is a circuit diagram for illustrating an example of the ON-timer circuit 111 of FIG. 2.

The current source circuit 220 includes resistors 202, 201, and 203, an amplifier 204, an NMOS transistor 205, and a PMOS transistor 206. The ripple generation circuit 230 includes a PMOS transistor 207, a switch circuit 208, a capacitor 209, and a resistor 210. The averaging circuit 240 includes a resistor 211 and a capacitor 212. The timer circuit 250 includes an inverter 213, an NMOS transistor 214, a capacitor 215, a comparator 216, and a PMOS transistor 217. The clamp circuit 260 includes a PMOS transistor 261, an amplifier 262, and a reference voltage circuit 263.

The current source circuit 220 generates the electric current I1 as follows.

The amplifier 204 has a non-inverting input terminal to which a voltage V1 obtained by dividing the power supply voltage by the resistor 202 and the resistor 201 is supplied, and therefore controls a gate voltage of the NMOS transistor 205 so that a connection point between a source of the NMOS transistor 205 and the resistor 203 becomes the voltage V1. Thus, the electric current I1 which depends on the power supply voltage flows through the resistor 203. The electric current I1 is supplied from the PMOS transistor 206 to the ripple generation circuit 230 via the PMOS transistor 207, and to the timer circuit 250 via the PMOS transistor 217.

The ripple generation circuit 230 generates the voltage Vcref0 as follows.

The capacitor 209 is charged with the electric current I1 to generate the voltage Vcref0 thereacross. The electric current I1 is expressed as I1=VDD×K, where VDD represents the power supply voltage, and K represents a proportionality factor. An electric current I2 which flows through the resistor 210 is expressed as I2=Vcref0/R2, where R2 is a resistance value of the resistor 210. When the signal VQ is at the High level, the switch circuit 208 is turned ON so that the capacitor 209 is charged with the electric current I1, and is discharged with the electric current I2. In contrast, when the signal VQ is at the Lo level, the switch circuit 208 is turned OFF so that the capacitor 209 is discharged with the electric current I2. A charge amount Q1 to be charged is expressed as Q1=I1×Ton, where Ton is time discharge while the signal VQ is at the High level. A charge amount Q2 is expressed as Q2=I2×TS, where TS is time from when the signal VQ becomes the High level to when the signal VQ becomes the High level again. When the output voltage Vout is controlled with a constant voltage, because Q1=Q2, Ton/TS=I2/I1=Vout/VDD. Developing the equation by substituting the electric currents I1 and I2, the voltage Vcref0 is expressed as Vcref0=Vout×R2×K. Consequently, the voltage Vcref0 is a voltage which is synchronized with the signal VQ from the RS-FF circuit 113, includes the ripple component, and is proportional to the output voltage Vout.

The averaging circuit 240 averages the voltage Vcref0 by the resistor 211 and the capacitor 212 to remove the ripple component from the voltage Vcref0. Thus, the voltage Vcref is a voltage which is equivalent to the voltage Vcref0 which does not include the ripple component.

The timer circuit 250 generates the signal VR as follows.

The NMOS transistor 214 has a gate to which the signal VQ is supplied via the inverter 213, and thus is controlled to be turned OFF when the signal VQ is at the High level, that is, when the NMOS transistor 115 is turned ON. When the NMOS transistor 214 is turned OFF, the capacitor 215 is charged with the electric current I1 so that a voltage Vcap thereacross is increased. The comparator 216 provides the signal VR of a Lo level to the output terminal 124 when the voltage Vcap is lower than the voltage Vcref, and provides the signal VR of the High level to the output terminal 124 when the voltage Vcap becomes higher than the voltage Vcref. The signal VQ becomes the Lo level with the signal VR of the High level, and the NMOS transistor 115 is controlled to be turned OFF. Then, the NMOS transistor 214 is turned ON when the signal VQ becomes the Lo level to discharge the capacitor 215.

The ON time Ton in which the NMOS transistor 115 is ON is Ton=C2/I1×Vcref=C2×R2×Vout/VDD, where C2 is a capacitance value of the capacitor 215. In other words, in the ON time Ton, duty control expressed by Vout/VDD can be performed. In this manner, the ON-timer circuit 111 can control the output voltage Vout to a desired voltage with the voltage Vcref which is proportional to the output voltage Vout without directly using the output voltage Vout.

In the DC/DC converter which operates as described above, under an overvoltage state in which the output voltage Vout is increased over the desired voltage, the voltage Vcref is proportional to the output voltage Vout and is therefore increased similarly. The clamp circuit 260 suppresses an increase in voltage Vcref to prevent the overvoltage of the output voltage Vout.

The clamp circuit 260 includes the PMOS transistor 261, the amplifier 262, and the reference voltage circuit 263. The amplifier 262 has an inverting input terminal− to which the voltage Vcref is supplied, and a non-inverting input terminal+ to which the reference voltage provided by the reference voltage circuit 263 is supplied. The PMOS transistor 261 has a source connected to the inverting input terminal− of the amplifier 262, a gate connected to an output terminal of the amplifier 262, and a drain connected to the ground terminal. The reference voltage, that is, a clamp voltage provided by the reference voltage circuit 263 is set to a value that is higher than the voltage Vcref=Vout×R2×K at the time of normal operation.

Under a normal state in which the voltage Vcref is lower than the reference voltage from the reference voltage circuit 263, because the amplifier 262 provides a voltage of a High level, the PMOS transistor 261 is OFF. Thus, the clamp circuit 260 does not perform the clamp operation.

When the output voltage Vout becomes the overvoltage state and the voltage Vcref reaches the reference voltage from the reference voltage circuit 263, the amplifier 262 controls a gate voltage of the PMOS transistor 261 so that the voltage Vcref does not exceed the reference voltage. Here, the ON time Ton is C2/I1×Vcref, and the output voltage Vout is Ton/TS×VDD. Consequently, the increase in output voltage Vout is suppressed, and the overvoltage protection operation can be performed.

As described above, the ON-timer circuit including the overvoltage protection circuit in the first embodiment controls the voltage Vcref so as not to exceed the clamp voltage from the clamp circuit 260, and can therefore provide overvoltage protection reliably without being affected by, for example, an external element connected to the output terminal 12.

Figure 4:
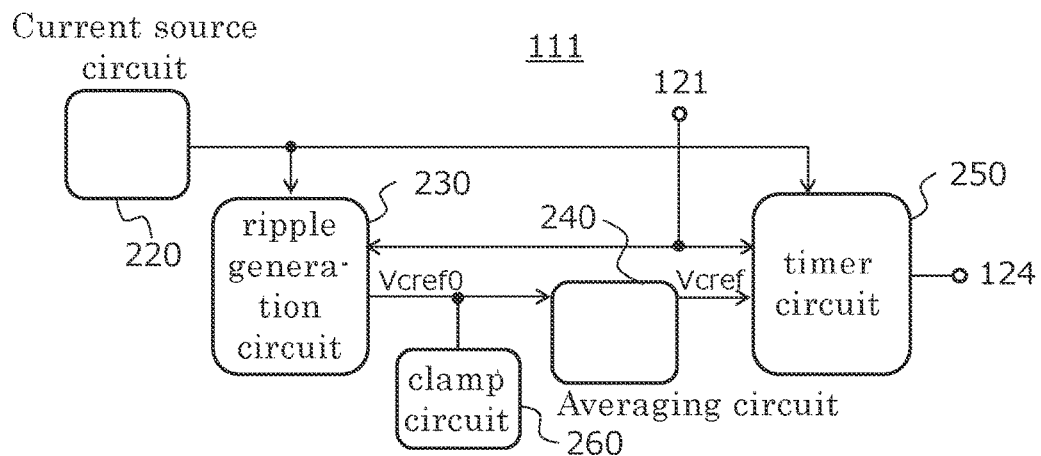
FIG. 4 is a block diagram for illustrating another configuration of the ON-timer circuit in the first embodiment.

FIG. 4 is a block diagram for illustrating another configuration of the ON-timer circuit in the first embodiment.

he ON-timer circuit 111 in this configuration is configured so that, in the ON-timer circuit 111 of FIG. 2, the clamp circuit 260 which is the overvoltage protection circuit is connected between the ripple generation circuit 230 and the averaging circuit 240. Because the other components are similar to those of the ON-timer circuit 111 of FIG. 2, a detailed description thereof is omitted.

The ON-timer circuit including the overvoltage protection circuit configured as in FIG. 4 controls the voltage Vcref0 so as not to exceed the clamp voltage from the clamp circuit 260, and therefore provides effects similar to those obtained by the first embodiment.

Second Embodiment

Figure 5:
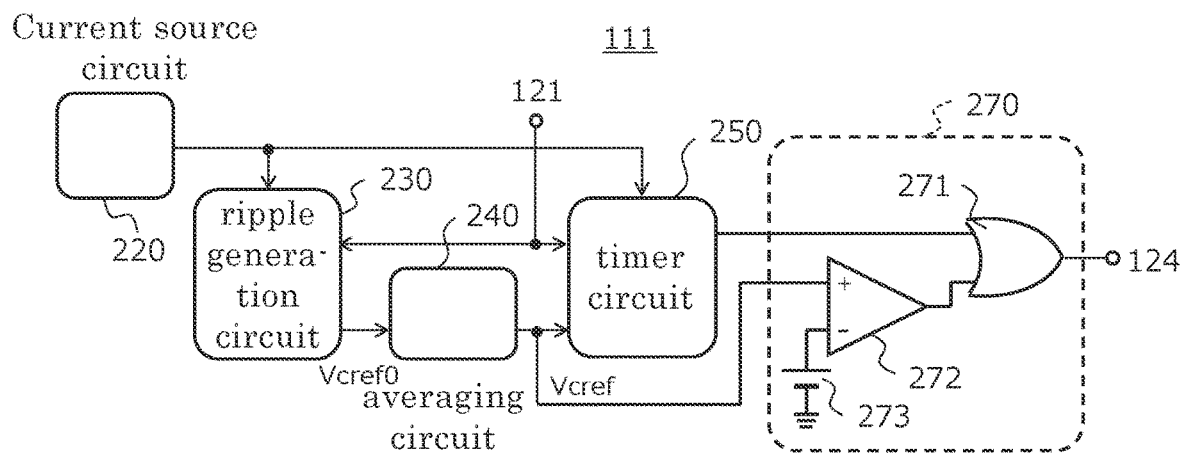
FIG. 5 is a block diagram for illustrating a configuration of an ON-timer circuit including an overvoltage protection circuit in a second embodiment of the present invention.
Figure 6:
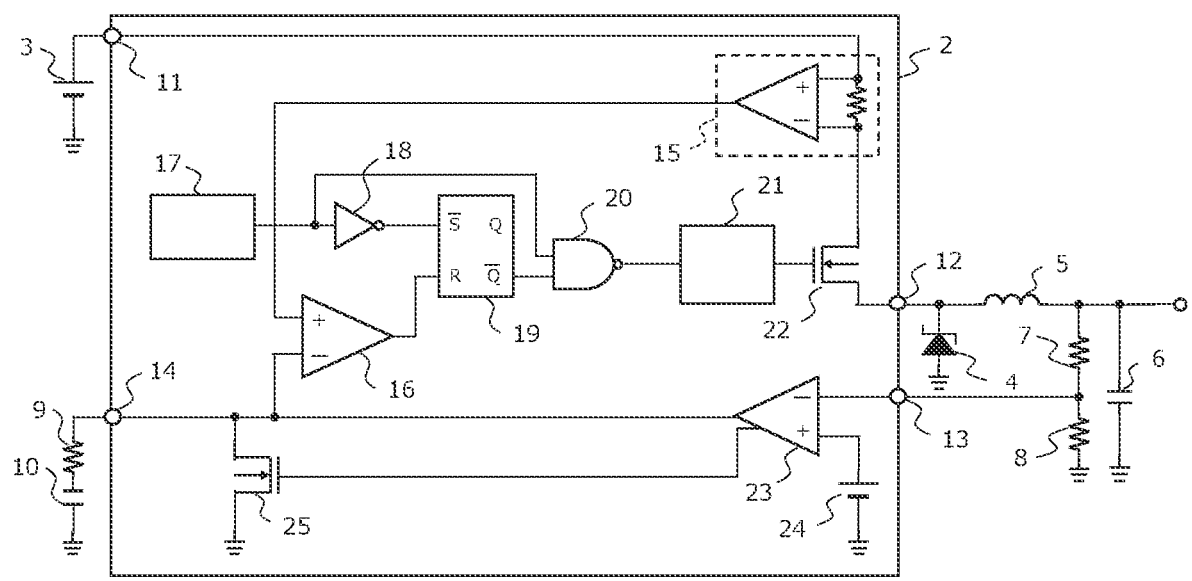
FIG. 6 is a block diagram for illustrating a switching regulator control circuit including an overvoltage protection circuit in a related art.

FIG. 5 is a block diagram for illustrating a configuration of an ON-timer circuit including an overvoltage protection circuit in a second embodiment of the present invention.

An ON-timer circuit 111 in the second embodiment includes, in the ON-timer circuit 111 of FIG. 2, an overvoltage protection circuit 270 instead of the clamp circuit 260 which is the overvoltage protection circuit. The overvoltage protection circuit 270 includes an OR circuit 271, a comparator 272, and a reference voltage circuit 273. A reference voltage from the reference voltage circuit 273 is set to a voltage that is higher than Vout×R2×K as with the clamp voltage from the clamp circuit 260.

The comparator 272 has an inverting input terminal− connected to an output terminal of the reference voltage circuit 273, and a non-inverting input terminal+ connected to an output terminal of the averaging circuit 240. The OR circuit 271 has a first input terminal connected to an output terminal of the timer circuit 250, a second input terminal connected to an output terminal of the comparator 272, and an output terminal connected to the output terminal 124 of the ON-timer circuit 111.

When the output voltage Vout becomes the overvoltage state, the voltage Vcref is increased as well as the output voltage Vout. When the voltage Vcref reaches the reference voltage, the comparator 272 provides a signal of a High level. When receiving the signal of the High level from the comparator 272, the OR circuit 271 provides a signal of a High level irrespective of an output signal from the timer circuit 250. In other words, the ON-timer circuit 111 provides the signal VR of the High level from the output terminal 124 to turn OFF the NMOS transistor 115 and turn ON the NMOS transistor 116. Consequently, the output voltage Vout can be reduced, and the overvoltage protection operation can be performed.

As described above, the ON-timer circuit including the overvoltage protection circuit in the second embodiment includes the comparator 272 which detects by the voltage Vcref that the output voltage Vout becomes the overvoltage state, and the OR circuit 271 which provides the signal from the comparator 272, and can therefore perform the overvoltage protection operation as in the first embodiment.

The at least one embodiment of the present invention has been described above, but the present invention is not limited to the above-mentioned at least one embodiment, and various modifications can be made thereto without departing from the gist of the present invention. For example, the clamp circuit in the first embodiment is not limited to the circuit illustrated in FIG. 3 as long as the circuit can perform clamping to the desired voltage.

What is claimed is:

1. A switching regulator control circuit, comprising:
a comparator configured to compare a divided voltage corresponding to an output voltage from a DC/DC converter and a reference voltage;
an RS-FF circuit having a set terminal connected to an output terminal of the comparator, and an output terminal connected to an input terminal of a drive circuit; and
an ON-timer circuit having an input terminal connected to the output terminal of the RS-FF circuit, and an output terminal connected to a reset terminal of the RS-FF circuit,
the ON-timer circuit including:
a current source circuit configured to provide an electric current based on a power supply voltage;
a ripple generation circuit configured to generate a ripple voltage depending on the electric current and an output signal from the RS-FF circuit;
an averaging circuit configured to average the ripple voltage;
a timer circuit configured to generate an ON-timer signal depending on the electric current, the output signal from the RS-FF circuit, and the averaged ripple voltage; and
a clamp circuit configured to clamp the ripple voltage to a predetermined voltage.

2. The switching regulator control circuit according to claim 1, wherein the clamp circuit is configured to clamp the ripple voltage provided by the ripple generation circuit.

3. The switching regulator control circuit according to claim 1, wherein the clamp circuit is configured to clamp the averaged ripple voltage provided by the averaging circuit.

4. A switching regulator control circuit, comprising:
a comparator configured to compare a divided voltage corresponding to an output voltage from a DC/DC converter and a reference voltage;
an RS-FF circuit having a set terminal connected to an output terminal of the comparator, and an output terminal connected to an input terminal of a drive circuit; and
an ON-timer circuit having an input terminal connected to the output terminal of the RS-FF circuit, and an output terminal connected to a reset terminal of the RS-FF circuit,
the ON-timer circuit including:
a current source circuit configured to provide an electric current based on a power supply voltage;
a ripple generation circuit configured to generate a ripple voltage depending on the electric current and an output signal from the RS-FF circuit;
an averaging circuit configured to average the ripple voltage;
a timer circuit configured to generate an ON-timer signal depending on the electric current, the output signal from the RS-FF circuit, and the averaged ripple voltage; and
an overvoltage protection circuit configured to provide the ON-timer signal irrespective of the ON-timer signal from the timer circuit when detecting that the averaged ripple voltage is a predetermined voltage or more.

5. A DC/DC converter, comprising:
the switching regulator control circuit of claim 1;
a coil and a capacitor provided at an output terminal of the switching regulator control circuit;
an output terminal of the DC/DC converter provided at a connection point between the coil and the capacitor; and
a voltage divider circuit which is provided between the output terminal of the DC/DC converter and an input terminal of the switching regulator control circuit, and is configured to provide a divided voltage obtained by dividing an output voltage from the DC/DC converter to the input terminal of the switching regulator control circuit.

6. A DC/DC converter, comprising:
the switching regulator control circuit of claim 4;
a coil and a capacitor provided at an output terminal of the switching regulator control circuit;
an output terminal of the DC/DC converter provided at a connection point between the coil and the capacitor; and
a voltage divider circuit which is provided between the output terminal of the DC/DC converter and an input terminal of the switching regulator control circuit, and is configured to provide a divided voltage obtained by dividing an output voltage from the DC/DC converter to the input terminal of the switching regulator control circuit.

* * * * *